US006914523B2

(12) United States Patent
Munch et al.

(10) Patent No.: US 6,914,523 B2
(45) Date of Patent: Jul. 5, 2005

(54) METHOD AND APPARATUS FOR SENSING TIRE PRESSURE

(75) Inventors: Carl A. Munch, Troy, MI (US); Timothy DeZorzi, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 66 days.

(21) Appl. No.: 10/135,213

(22) Filed: Apr. 30, 2002

(65) Prior Publication Data

US 2003/0201879 A1 Oct. 30, 2003

(51) Int. Cl.$^7$ ............................................. B60C 23/00
(52) U.S. Cl. ................... 340/447; 340/442; 340/444; 340/448; 340/438; 73/146; 73/146.5
(58) Field of Search ................. 340/442, 444, 340/447, 448, 438; 73/146, 146.2, 146.5; 116/34 R, 34; 200/61.45, 61.46, 61.22

(56) References Cited

U.S. PATENT DOCUMENTS

| | | | |
|---|---|---|---|
| 5,483,827 A | * | 1/1996 | Kulka et al. ............... 73/146.5 |
| 5,600,301 A | * | 2/1997 | Robinson, III ............. 340/442 |
| 5,629,478 A | * | 5/1997 | Nakajima et al. ........... 340/444 |
| 5,736,852 A | | 4/1998 | Pattantyus |
| 5,844,475 A | * | 12/1998 | Horie ........................ 340/442 |
| 5,922,949 A | | 7/1999 | Nakajima |
| 6,062,072 A | | 5/2000 | Mock et al. |
| 6,087,930 A | * | 7/2000 | Kulka et al. ................ 340/447 |
| 6,169,480 B1 | | 1/2001 | Uhl et al. |
| 6,194,999 B1 | | 2/2001 | Uhl et al. |
| 6,384,720 B1 | * | 5/2002 | Juzswik et al. ............ 340/442 |
| 2001/0008083 A1 | | 7/2001 | Brown |

FOREIGN PATENT DOCUMENTS

FR 2807362 10/2001

OTHER PUBLICATIONS

Technical Disclosure RD–407026 which may have been published in 1998.

* cited by examiner

*Primary Examiner*—Hung Nguyen
(74) *Attorney, Agent, or Firm*—Tarolli, Sundheim, Covell & Tummino L.L.P.

(57) ABSTRACT

An apparatus for sensing pressure in vehicle tires includes an interrogator (102) for providing a tire pressure interrogation signal, and a tire pressure monitor (70) for sensing pressure within a first tire (24) of the vehicle (20) and providing an actual tire pressure signal. A first wheel speed sensor (42) associated with the first tire (24) provides a reference wheel speed signal upon movement of the vehicle (20). A second wheel speed sensor (40) associated with a second tire (22) of the vehicle (20) provides a wheel speed signal upon movement of the vehicle. A controller (60) activates the interrogator (102), monitors the actual tire pressure signal, and correlates the reference wheel speed signal with the wheel speed signal from the second wheel speed sensor (40) for determining a tire pressure value of the second tire (22).

63 Claims, 5 Drawing Sheets

METHOD AND APPARATUS FOR SENSING TIRE PRESSURE

TECHNICAL FIELD

The present invention is directed to tire pressure sensing and is particularly directed to a method and apparatus for sensing tire pressure in a vehicle having wheel speed sensors such as found in an antilock braking system.

BACKGROUND OF THE INVENTION

Tire pressure monitoring systems are known in the art. Such known systems include a plurality of sensor assemblies, each sensor assembly mounted to an associated vehicle wheel inside of the associated tire and powered by a long-life battery. The sensor assembly includes a pressure sensor and a temperature sensor that monitors the tire pressure and temperature, respectively. When the tire pressure is below a threshold, a transmitter circuit of the sensor assembly transmits an RF signal to a vehicle-based receiver indicating a low-pressure condition. The vehicle-based receiver, upon receiving a low-pressure indication from a sensor assembly, activates an indicator within the passenger compartment to warn the driver. Tire pressure and temperature sensors also transmit pressure and temperature information periodically.

In a sensor system that includes four sensor assemblies for a vehicle, each sensor will have an associated identification code to distinguish itself from the other sensor assemblies of the vehicle. As part of transmission of a low tire pressure signal, each sensor assembly, upon detecting a low-pressure condition, transmits its identification code along with an indication of the low-pressure condition. Assuming the vehicle-based receiver is preprogrammed to associate a particular identification code with a particular tire location, the receiver can control a low-pressure indicator or display within the vehicle compartment to indicate the tire location having the low-pressure condition.

Antilock brake systems often have wheel speed sensors electrically connected to a vehicle-based controller through a hard-wired connection. Such systems may include a wheel speed sensor mounted near a toothed plate, the toothed plate being connected to an associated vehicle wheel to rotate as the wheel rotates. The controller monitors vehicle wheel rotation by monitoring electrical pulses from each wheel speed sensor. The antilock braking system provides slip control of the wheels via control of a hydraulic modulator by the controller during a braking condition to prevent wheel lock-up.

SUMMARY OF THE INVENTION

In accordance with the present invention, a method and apparatus are provided for determining pressure within vehicle tires. A tire pressure monitor senses pressure within one of the tires in response to an interrogation signal. Wheel speed sensors sense wheel speeds of the vehicle tires. The wheel speed sensor associated with the tire having the tire pressure monitor provides a reference wheel speed signal. The reference wheel speed signal is correlated with other wheel speed signals for determining tire pressure within the other tires.

In accordance with one exemplary embodiment of the present invention, an apparatus is provided for sensing pressure in vehicle tires comprising means for providing an interrogation signal, means for sensing pressure within one of the tires in response to the interrogation signal, means for sensing wheel speeds of the vehicle tires and providing wheel speed signals, a wheel speed signal of the one tire in which pressure is sensed being a reference wheel speed signal, and means for correlating the reference wheel speed signal with other of the wheel speed signals for determining tire pressure within associated tires.

In accordance with another exemplary embodiment of the present invention, an apparatus is provided for sensing pressure in vehicle tires. An interrogator, when actuated, provides an interrogation signal. A tire pressure monitor senses pressure within a first tire of the vehicle in response to the interrogation signal and provides an actual tire pressure signal. A first wheel speed sensor associated with the first tire provides a reference wheel speed signal upon movement of the vehicle. The apparatus further comprises a second wheel speed sensor associated with a second tire of the vehicle and provides a wheel speed signal upon movement of the vehicle. A controller is connected to the interrogator for actuating the interrogator, monitoring the actual tire pressure signal, and correlating the reference wheel speed signal with the wheel speed signal from the second wheel speed sensor for determining a tire pressure value of the second tire.

In accordance with yet another exemplary embodiment of the present invention, an apparatus for sensing pressure in vehicle tires comprises means for sensing pressure within one of the tires, means for detecting in which tire the pressure sensor is located, means for sensing wheel speeds of the vehicle tires and providing wheel speed signals, a wheel speed signal of the one tire in which the means for sensing pressure is detected being a reference wheel speed signal, and means for correlating the reference wheel speed signal with other of the wheel speed signals for determining tire pressure within associated tires.

In accordance with another exemplary embodiment of the present invention, a method is provided for sensing pressure in vehicle tires comprising the steps of interrogating a pressure measurement with a remote signal, sensing pressure within one of the tires in response to the interrogating, sensing wheel speeds of the vehicle tires and providing wheel speed signals, a wheel speed signal for the one tire in which pressure is sensed being a reference wheel speed signal, and correlating the reference wheel speed signal with other of the wheel speed signals for determining tire pressure within associated tires.

In accordance with yet another exemplary embodiment of the present invention, a method is provided for sensing pressure in vehicle tires comprising the steps of interrogating a pressure measurement with a remote signal sensing pressure within a first tire of the vehicle in response to the interrogation and providing an actual tire pressure signal, providing a reference wheel speed signal for the first tire of the vehicle upon movement of the vehicle, providing a wheel speed signal for a second tire of the vehicle upon movement of the vehicle, monitoring the actual tire pressure signal, and correlating the reference wheel speed signal with the wheel speed signal from the second tire and determining a tire pressure value of the second tire in response to the correlating.

In accordance with yet another exemplary embodiment of the present invention, a method for sensing pressure in vehicle tires comprises the steps of sensing pressure within one of the tires, detecting in which tire the pressure sensor is located, sensing wheel speeds of the vehicle tires and providing wheel speed signals, a wheel speed signal of the one tire in which the means for sensing pressure is detected being a reference wheel speed signal, and correlating the reference wheel speed signal with other of the wheel speed signals for determining tire pressure within associated tires.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
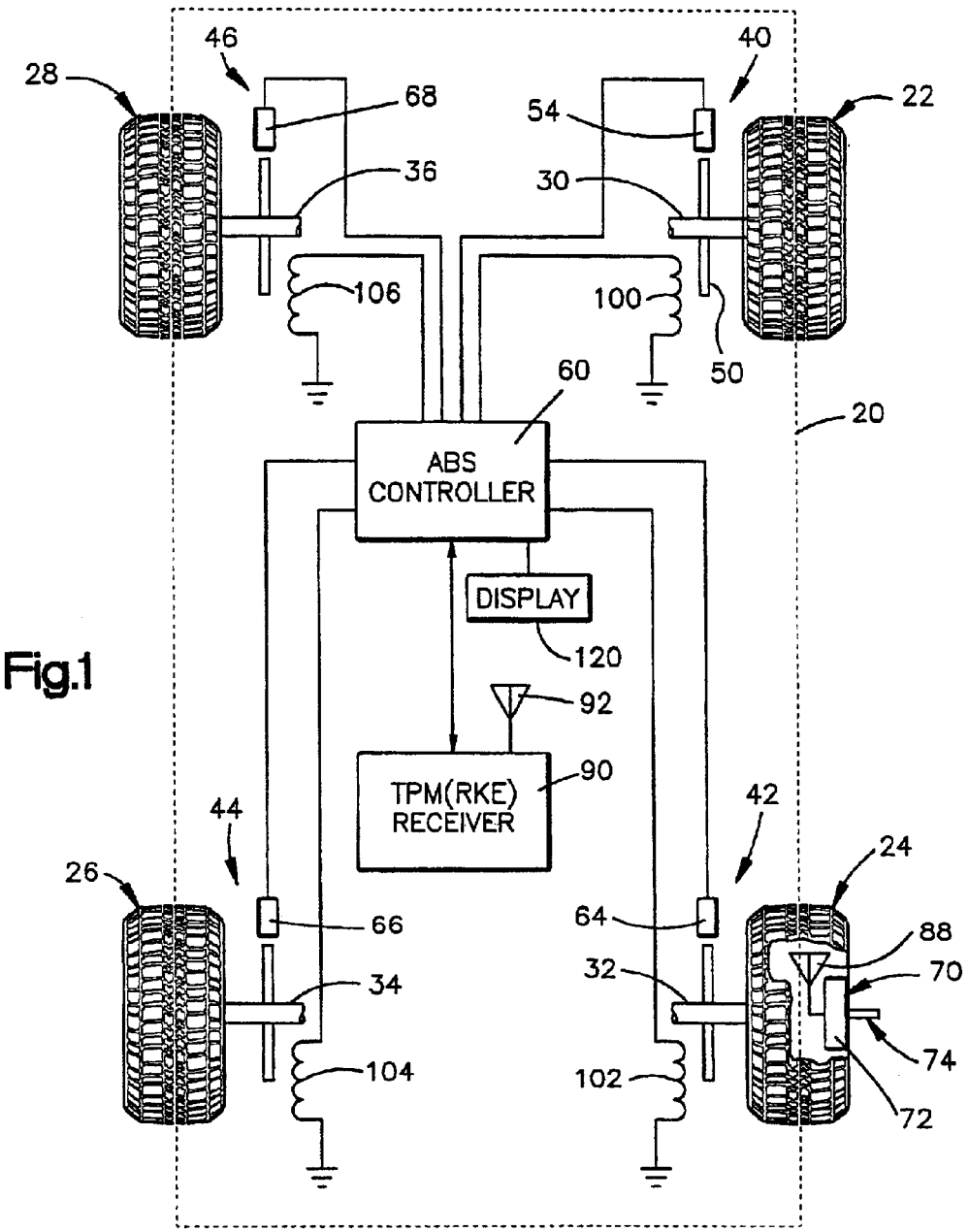
FIG. 1 is a schematic illustration of a vehicle having a tire pressure monitoring system in accordance with the present invention.

Referring to FIG. 1, a vehicle 20 includes four wheel/tire assemblies 22, 24, 26, 28 mounted on vehicle axles 30, 32, 34, 36, respectively, in a manner known in the art. Each of the wheel/tire assemblies 22–28 has associated wheel speed sensor assemblies 40, 42, 44, 46, respectively. Only one wheel speed sensor assembly 40 is described in detail, it being understood that the other wheel speed assemblies 42, 44, and 46 are similarly constructed.

Figure 2:
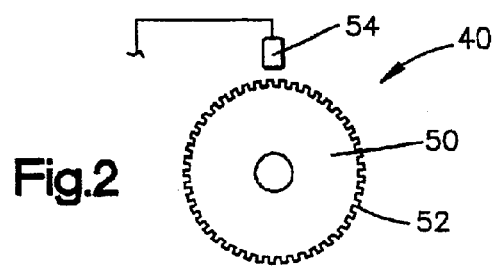
FIG. 2 is a schematic illustration of a wheel speed sensor shown in FIG. 1.

The wheel speed assembly 40 includes a tooth disk 50 having a plurality of teeth 52 (FIG. 2). The disk 50 is mounted to rotate with the wheel/tire assembly 22. A wheel speed sensor 54, such as a variable reluctance sensor, is fixedly mounted to the vehicle 20 radially adjacent the disk 50 and is electrically connected to an anti-lock brake system ("ABS") controller 60. As the disk rotates past the sensor 54, electrical pulses are provided to the controller 60. Since there are a fixed number of teeth 52 on the disk 50, a fixed number of pulses per revolution will be provided to the controller 60. These pulses can be interpreted as a number of counts per revolution. A number of counts per second will, therefore, be indicative of the speed of the wheel/tire assembly 22.

The controller 60 is electrically connected to wheel speed sensor 54, 64, 66, and 68. The ABS controller is electrically connected to other components (not shown) of an anti-lock braking system, as is known in the art, and, during braking, controls a hydraulic modulator (not shown) in response to other inputs, including the signals received from the wheel speed sensors 54, 64, 66, and 68 to control wheel slip and prevent brake lock-up during a braking condition. Such a control of an anti-lock brake system is well known in the art and is not explained herein. The present invention is applicable to any anti-lock braking system or any other vehicle system having wheel speed sensors. The present invention could be practiced by simply including wheel speed sensors on a vehicle notwithstanding any other vehicle system.

The rolling radius of a tire is a function of the pressure within the vehicle tire. Ideally, four identical sized tires at the same pressure would provide the same number of wheel speed sensor counts per a given distance during vehicle movement. Therefore, the ABS controller 60 could monitor the number of counts per unit of time from the four wheel speed sensors and determine a relative pressure between the four tires knowing how pressure-effects the radius or diameter of the tire. If one of the tires was under-inflated relative to the other three tires, it would have a smaller diameter and would produce more counts over the same time or distance traveled by the vehicle 20.

Such an arrangement of monitoring pressure based on counts over distance or counts per second between the tires is only indicative of relative pressure between the tires and not an indication of absolute pressure in any of the tires. If a tire pressure monitoring system were to be based on only wheels speed sensor counts over distance or counts per second, it would not be possible to determine if all four tires were equally under or over inflated.

Figure 3:
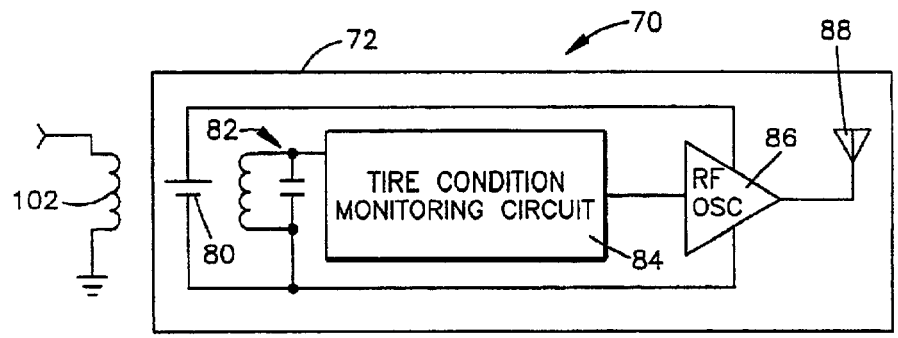
FIG. 3 is a circuit schematic of a tire pressure monitor in accordance with one embodiment of the present invention.

In accordance with the present invention, one of the wheel/tire assemblies (e.g., 24) includes an internal tire pressure monitor ("TPM") 70. In accordance with one exemplary embodiment of the present invention, the TPM 70 (FIG. 3) is a self-contained unit within a housing 72 secured to the wheel by straps (not shown) or as part of the valve stem assembly 74. The TPM 70 is powered by a long-life battery 80. A low frequency ("LF") receiving circuit 82 is connected to a tire condition monitoring circuit 84 that monitors tire conditions such as pressure, temperature, etc. in response to the receiving circuit 82 receiving a LF interrogation signal. The tire condition monitoring circuit 84 is connected to an radio frequency ("RF") drive circuit 86 for transmitting monitored or measured tire information via an RF signal from an antenna 88.

The tire condition monitor circuit is used to measure an actual tire pressure within the tire of the wheel/tire assembly 24 and transmit the information (measured values) to a TPM receiver 90 via a receiver antenna 92. The TPM receiver 90 may be a dedicated TPM receiver or a receiver of a remote convenience system such as a vehicle's remote-keyless-entry ("RKE") receiver adapted to receive TPM signals. Using the RKE receiver would reduce the need and cost of a separate receiver. The RKE signals from a RKE transmitter and the TPM signals are distinguishable by the receiver 90 and preferably have different protocol.

The TPM receiver 90 is connected to the ABS controller 60 and provides the controller 60 with information regarding the actual measured tire conditions as measured by the TPM 70. By knowing the actual measured conditions, e.g., pressure, the TPM controller 60 can correlate the actual tire pressure with the wheel speed signal from sensor 64. The wheel speed count or counts per unit of time is correlated to the actual tire pressure. The wheel speed sensor 42 then functions as a reference wheel speed signal by which the other wheel speed signals are compared. Assuming the tires are all the same size, the counts or counts per unit of time from the other wheel speed sensors correlated with the reference wheel speed signal (counts or counts per unit of time) can accurately indicate the pressure within those associated tires.

The TPM sensor 70 can periodically transmit the tire pressure information and a reference wheel speed signal established if the TPM controller "knows" which wheel/tire assembly the TPM sensor 70 is located. It is possible to define one of the vehicle tire locations as that location which must have the TPM. In accordance with an exemplary embodiment of the present invention, the TPM controller can find the TPM 70 location each time the vehicle is started and begins moving. To accomplish finding of the TPM, the TPM controller is connected to a plurality of LF transmitting antennas, one associated with each wheel/tire assembly. Specifically, the TPM controller is connected to LF transmitting antennas 100, 102, 104, and 106 mounted in close proximity to wheel/tire assemblies 22, 24, 26, 28, respectively.

To determine the location of the TPM sensor 70, the TPM controller sequentially energizes each of the LF antennas to transmit a low power LF interrogation signal that creates a local field around its associated wheel arch. If the TPM 70 is located in the tire adjacent an energized LF antenna, the LF receiving circuit 82 responds by sending a signal to the tire condition monitoring circuit 84. This forces a tire condition measurement and the transmission of an RF tire condition information signal. After each interrogation of an LF antenna, the controller 60 monitors for receipt an RF information signal. If no RF signal is received, the controller "knows" the TPM 70 is not located at that wheel/tire assembly location. If the controller does receive a return RF information signal, it then "knows" the location of the TPM 70. After the TPM location is known, the controller 60 can identify that associated wheel speed sensor as the reference wheel speed sensor and use it for the pressure determination in the other tires by correlation with their associated wheel speed sensor signals.

The ABS controller 60 is connected to a display device 120 that is used to display when a tire pressure or other condition evidenced by a change in tire diameter is outside of a predetermined limit. The display 120 can display the determined tire pressure in the four tires, the determined pressures being determined based on the actual pressure measurement measured by the TPM 70.

The TPM may be only periodically interrogated based on time or conditions. Once pressure values in the other tires is determined, a role reversal could occur in that those wheel speed sensors can be used to monitor the pressure in the tire in assembly 24 having the TPM by monitoring the wheel speed sensor 64 and comparing its signal against the other wheel speed sensor signals. For example, if the TPM controller sees a change in the wheel speed sensor signal from sensor 64 while the other wheel speed signals are steady, the pressure in the tire of assembly 24 can be determined based on the other wheel speed sensor signals as a reference. The controller, at that point, re-interrogates the TPM to confirm the pressure determination.

Figure 4A:
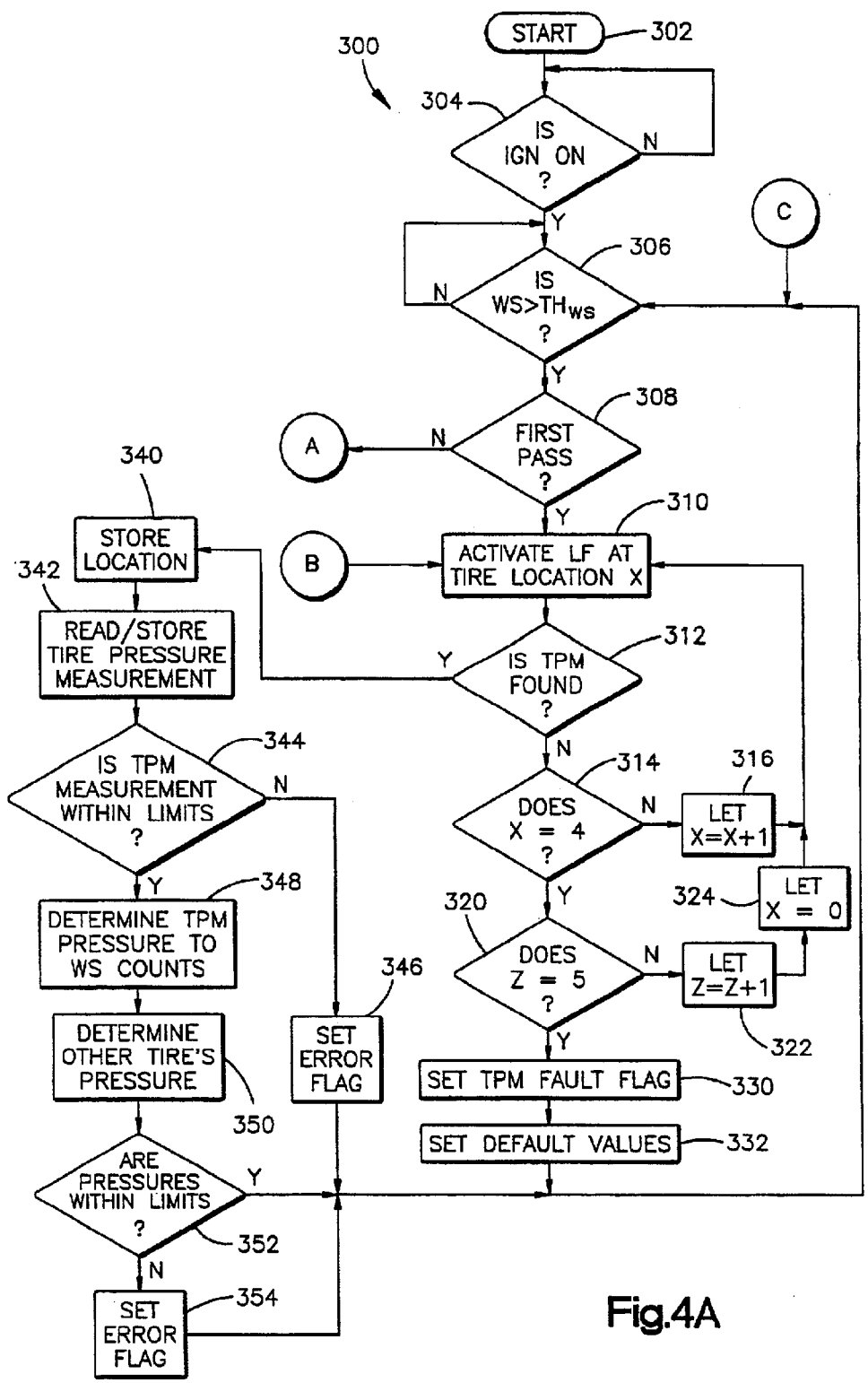
FIGS. 4A and 4B are flow diagrams showing a control process in accordance with the present invention.
Figure 4B:
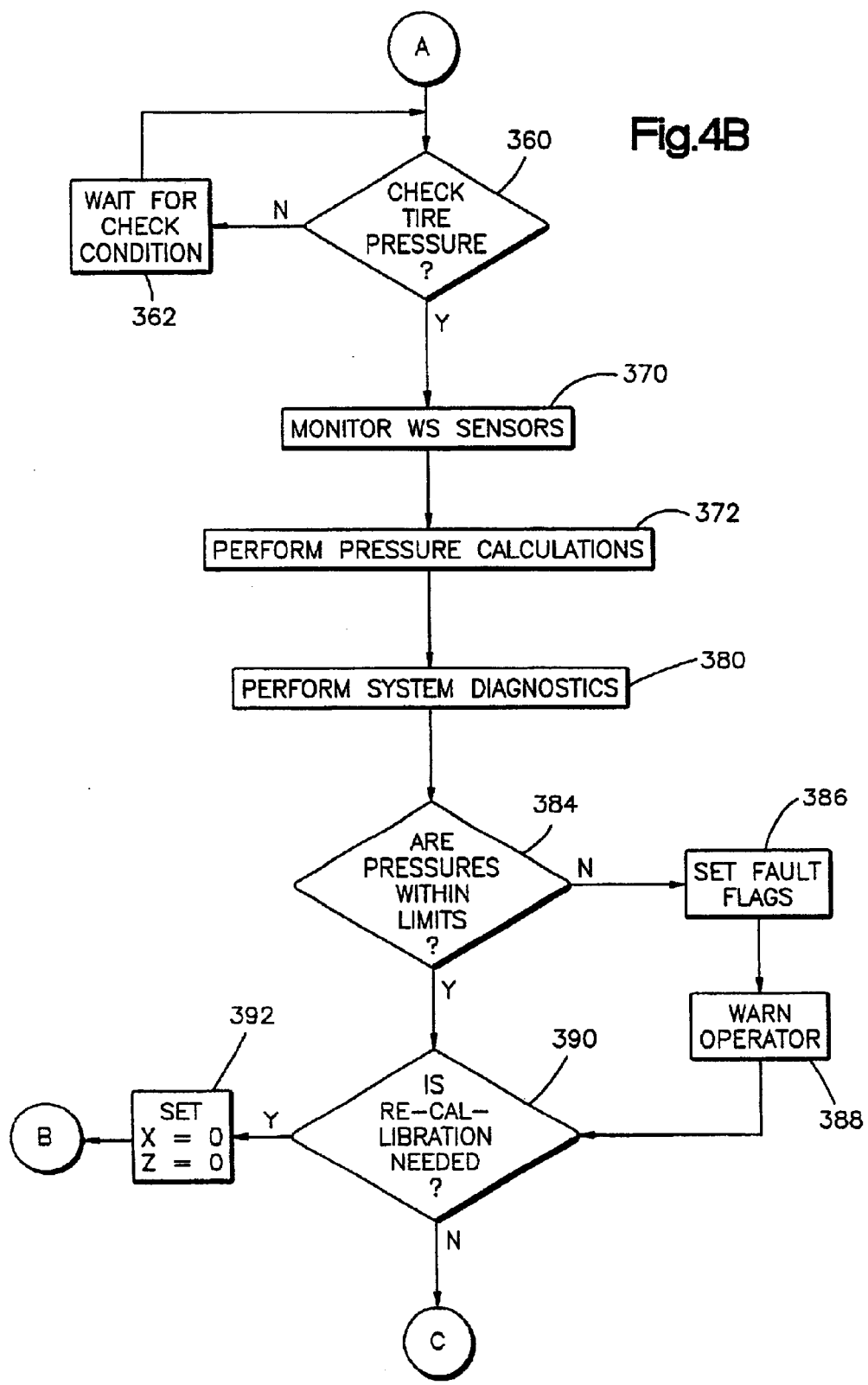

Referring to FIGS. 4A and 4B, a control process 300, in accordance with an exemplary embodiment of the present invention, is shown. The control process begins at step 302 where initial memories are cleared, flag conditions sets, initial values set, etc. In step 304, a determination is made as to whether the vehicle ignition is switched on. If the determination is negative, the process, in effect waits until an ignition-on event occurs. The process may not even start until ignition-on occurs. Once ignition-on occurs, the determination in step 304 is affirmative. From an affirmative determination in step 304, the process proceeds to step 306 where it is determined if the wheel speed "WS" as sensed by any of the sensors 54, 64, 66, or 68 has exceeded a threshold $TH_{WS}$. The control arrangement 300 is arranged to determine the location of the TPM 70 each time the vehicle is started and the vehicle is moving above a predetermined speed threshold.

If the determination in step 306 is negative, the process loops back and continues to monitor for a condition when the wheel speed exceeds a minimum threshold. From an affirmative determination in step 306, a determination is made in step 308 as to whether this is the first pass through the process. The first time through the process will lead to an affirmative determination in step 308. The process them proceeds to step 310 where the TPM controller 60 begins a sequential activation of the LF transmitters at each wheel location. For example, the controller can proceed in the following sequence: passenger front, passenger rear, driver front, and then driver rear. The sequence can be any desired.

After an LF transmission occurs in step 310, a determination is made in step 312 at to whether an RF return signal has been received from a TPM 70. If the TPM 70 is not located at the tire having its LF transmitter activated, no return sign will be received, i.e., the determination is step 312 will be negative. The process then proceeds to step 314 in which a determination is made as to whether a variable X is equal to 4. In step 302, the value of X is initially set to 0. This is a counting step to make sure that the all four vehicle corners are tested for the presence of the TPM 70. The first time through the loop, the determination in step 314 will be negative. The process proceeds to step 316 where the value of X is updated to equal X+1. The process then loops back to step 310 where the next tire location is tested by activating its associated LF transmitter or interrogator signal. The steps 310–316 ensure that all four corners are tested.

Assume that after all four corners are tested, the TPM is not found. After the forth test, the determination in step 314 will be affirmative. The process would then proceed to step 320 where a determination is made as to whether a variable Z=5. The value of Z is initially set to 0 in step 302. The first time through step 320, the determination will be negative. The process then proceeds to step 322 where the value of Z is updated to Z+1 and then to step 324 where the value of X is again set equal to 0. The process then loops back to step 310 where all four corners are again interrogated for the presence of TPM 70. The steps 320, 322, and 324 insure that the system will look for the TPM at all four corners a predetermined number of times. In the example described, the system will look for the TPM a maximum of 5 times at each corner. The number in step 320 can be any selected, 5 times being given only as an example.

If the steps 308–324 are executed 5 times and no TPM is found, the determination in step 320 will be affirmative and the process will proceed to step 330 where a TPM fault flag is set meaning that there is an error in that the TPM can not be found. The vehicle operator will be advised of the error condition though the display 120. Default values to determine tire pressure based on the wheel speed sensor signals alone are set in step 332. The process then loops back to step 306.

Assuming the TPM 70 is found at one of the vehicle corners in response to the LF interrogation signal, the determination is step 312 will be affirmative and the process proceeds to step 340. Since the controller 60 "knows" which LF interrogator it activated when a response was received, it "knows" which corner, i.e., which tire, has the TPM. The power level of the LF interrogation signals is such that only a TPM at its associated tire location could pick up its signal and respond thereto. The location of the found TPM is then stored in memory in the controller 60 in step 340.

The pressure measurement is sent by the TPM in response to the LF interrogation signal and this value, which represents an absolute pressure measurement, is read and stored in step 342. The process proceeds to step 344 where a determination is made as to whether the TPM absolute tire pressure measurement is within predetermined limits. If the determination is negative, a tire pressure error flag is set in step 346 and the vehicle operator is warned via the display 120. The process would then loop back to step 306. If the pressure within limits determination step 344 is affirmative, the process proceeds to step 348.

The number of counts of the wheel speed sensor associated with the wheel/tire assembly for a complete revolution is then correlated in step 348 with the absolute tire pressure measurement. For example, assuming a wheel speed disk has 180 teeth on it and the monitored tire pressure by the TPM is 30 psi, that means that its associated wheel speed sensor will provide 180 pulses (i.e., counts per revolution) for a tire having 30 psi. As the vehicle is moving, the number of pulses per second (i.e., counts per unit of time) from that tire is also representative of a tire at 30 psi. Correlation based on either counts per distance or counts per unit of time is used as the reference wheel speed signal to determine the pressure in the other tires.

These values are only given by way of example. Those skilled in the art will appreciated that one revolution of a tire may not provide sufficient data to resolve a change in tire pressure. For example, a change of 5 psi may only make a change of 0.1 counts in a complete revolution. The number of revolutions required or the amount of monitoring time required to detect a change in pressure depends on the resolution desired.

In step 350, the other wheel speed sensors are monitored relative to the reference wheel speed signal. If when the reference wheel speed signal provides 180 counts or pulses and another one of the wheel speed sensors also provides 180 counts, it can be assumed that the pressure in that associated tire is 30 psi. This is also true if the same number of pulses per second are being received from both wheel speed sensors. If a monitored wheel speed provides 175 counts for each 180 counts provided from the reference wheel speed signal, the tire pressure in that monitored tire is greater than 30 psi. If a monitored wheel speed provides 185 counts for each 180 counts provided from the reference wheel speed signal, the tire pressure in that monitored tire is less than 30 psi. Again, these numbers are given as examples only to help understand the invention and do not reflect actual values that may be expected. The actual correlation values of the monitored tires relative to the reference wheel speed signal depend on non-mounted tire size and tire type. It should be appreciated that relative to the reference wheel speed signal, the relative count or counts per second from other wheel speed sensors is indicative of pressure in those tires. The count or counts per second of a wheel speed sensor relative to the reference wheel speed sensor is indicative of pressure. The process then loops back to step 306 after the TPM is found, its absolute tire pressure is determined and other tire pressures determined (assuming there was not TPM error). It should be appreciated that correlation can be based on relative counts or based on relative counts per second. The term "wheel speed signal" is meant to cover both types of correlation.

From the pressure determinations in step 350, a determination is made in step 352 as to whether the determined pressures in step 350 are within predetermined limits. If the determination is negative, a pressure error flag is set in step 354 and the vehicle operator is warned via the display 120. This warning can include tire location and determined pressure value. The warning could be a simple signal lamp or buzzer indicating a tire pressure problem. From step 354 or an affirmative determination in step 352, the process loops back to step 306.

The second time through the process step described above, the determination in step 308 will be negative. From this negative determination, the process proceeds to step 360 where a determination is made as to whether new tire pressure determinations should be made. Pressure determinations can be based on any of several factors. For example, it may be desirable to determine tire pressures based on a time interval, a distance interval, temperature, vehicle speed, acceleration rates, braking intervals, etc.

If the determination in step 360 is negative, the process proceeds to step 362 where the process awaits the next determination event to occur. From an affirmative determination in step 360, the process proceeds to step 370 where the process monitors all of the wheel speed sensors and pressure determinations are made in step 372 based on the value of the absolute pressure measurement and the reference wheel speed signal. System diagnostics are performed in step 380 which includes, for example, a determination that signals are being received from all the wheel speed sensors, no intermittent connections exist, etc. If an error is found in the system diagnostics, a system error flag would be set and the vehicle operator informed via the display 120.

A determination is made in step 384 as to whether the determined pressure values determined in step 372 are within predetermined limits. If the determination is negative, pressure error flags are set in step 386 and the vehicle operator is warned in step 388 via the display 120. From step 388 or an affirmative determination in step 384, the process proceeds to step 390.

In step 390, a determination is made as to whether the TPM absolute pressure measurement value should be recalibrated or updated. Again, this determination can be made on any of several factors such as a time interval, a distance interval, temperature, vehicle speed, acceleration rates, braking intervals, etc. If the determination is affirmative, the values of X and Z are set to 0 in step 392 and the process loops back to step 310. Alternatively, since the controller "knows" the TPM location as was stored in step 340, the interrogator for the associated tire having the TPM 70 can simply be activated and the pressure value monitored and updated. Any updated value would then be used in further pressure determinations. If the determination in step 390 is negative, the process loops back to step 306.

In determining tire pressure using wheel speed sensors, those skilled in the art will appreciate that filtering is necessary so that false pressure readings will not occur during vehicle turning, wheel slippage as on ice, etc.

Figure 5:
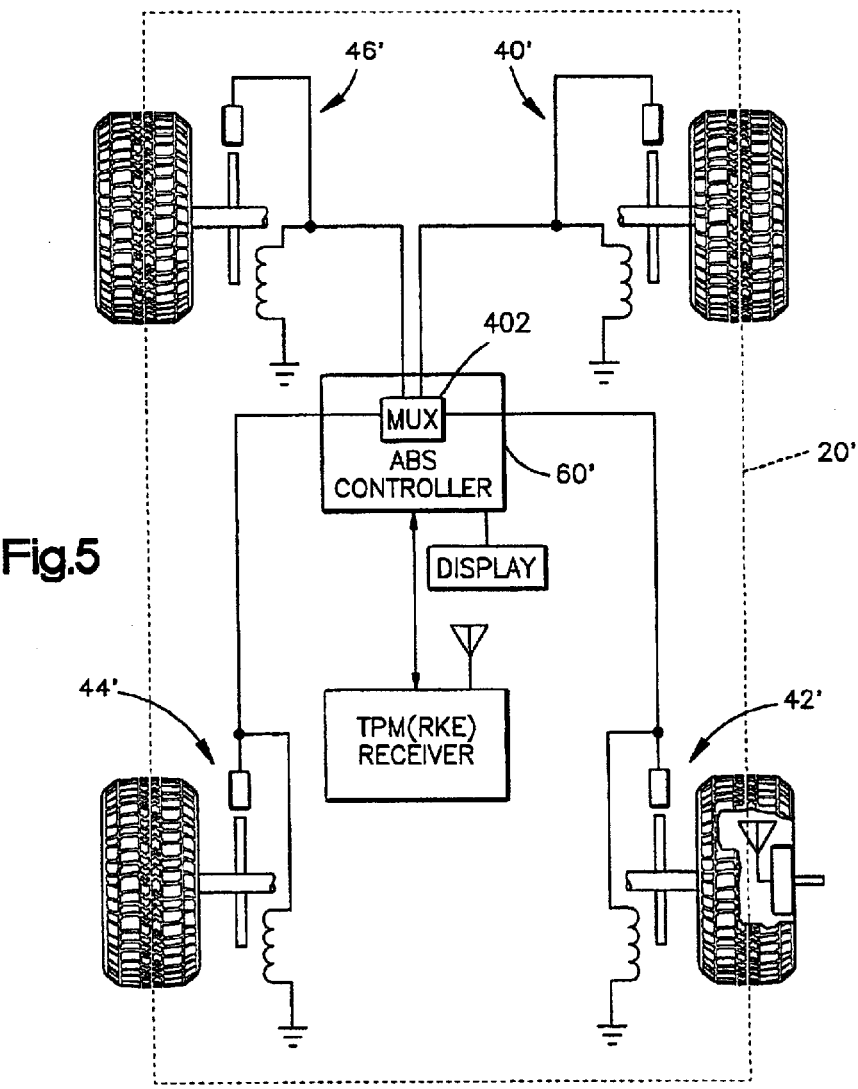
FIG. 5 is a schematic illustration of a vehicle having a tire pressure monitoring system in accordance with another embodiment of the present invention.

Referring to FIG. 5, another embodiment of the present invention is shown in which the wheel speed sensor assemblies 40', 42', 44', and 46' share a wiring connection between the LF antenna and the wheel speed sensor of the ABS controller 60'. The signals are multiplexed via a MUX 402 within the controller 60' so that the LF interrogation signal and the received wheel speed sensor signal can be separately processed.

Figure 6:
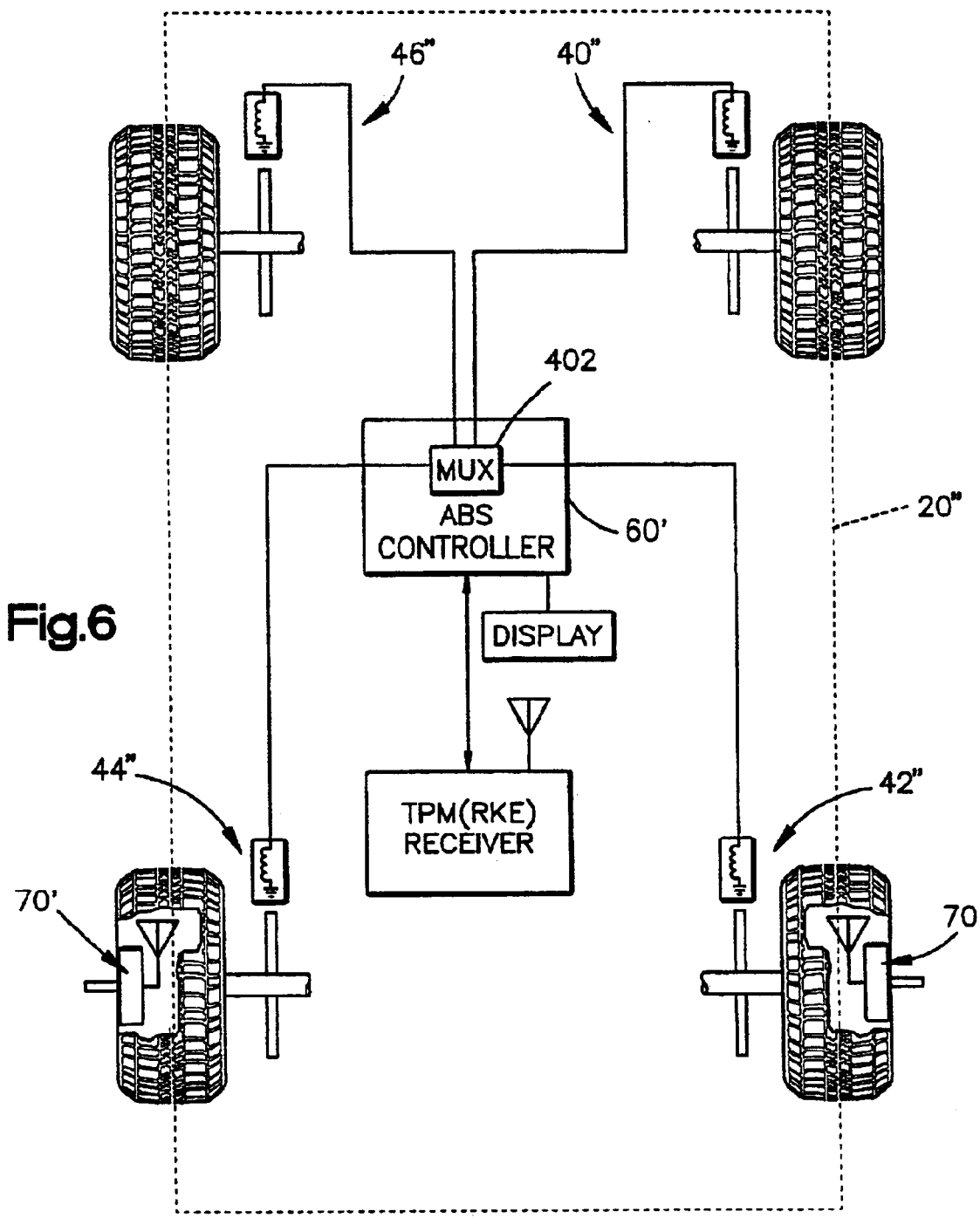
FIG. 6 is a schematic illustration of a vehicle having a tire pressure monitoring system in accordance with yet other embodiments of the present invention.

In accordance with another embodiment of the present invention shown in FIG. 6, VR wheel speed sensors of the assemblies 40", 42", 44", and 46" are also used as the LF transmitting antenna thereby eliminating the need for a separate LF antenna. In such an arrangement, the LF and WS signals would be multiplexed by the ABS controller 60'.

In accordance with yet another embodiment of the present invention also shown in FIG. 6, TPM sensors 70, 70' are used, one on each side of the vehicle. The TPM on one side of the vehicle is used to establish a reference wheel speed signal for that associated side of the vehicle only. This would eliminate the need for pressure determination filtering during vehicle turning, for example. With TPM's 70, 70' on associated sides of the vehicle, pressure determinations could still be made if one of the TPM's stops functioning using on the remaining TPM in a process as described above.

Those skilled in the art should appreciate that a tire pressure monitoring apparatus and method in accordance with the present invention provides a cost effective and fast determination of tire conditions including overpressure, under pressure, improper tire sizes, high load conditions, temperature effects, tire aging, and can detect pressure lose in multiple tires.

From the above description of the invention, those skilled in the art will perceive improvements, changes and modifications. For example, the wheel speed sensors have been described as a VR sensor. Hall effect sensors could be used. Such improvements, changes and modifications within the skill of the art are intended to be covered by the appended claims.

Having described the invention, the following is claimed:

1. An apparatus for sensing pressure in vehicle tires comprising:

an interrogator, when actuated, providing an interrogation signal;

a tire pressure monitor for sensing pressure within a first tire of the vehicle in response to the interrogation signal and providing an actual tire pressure signal;

a first wheel speed sensor associated with the first tire for providing a reference wheel speed signal upon movement of the vehicle;

a second wheel speed sensor associated with a second tire of the vehicle and providing a wheel speed signal upon movement of the vehicle; and a controller connected to said interrogator for actuating said interrogator, monitoring the actual tire pressure signal, and correlating the reference wheel speed signal with the wheel speed signal from the second wheel speed sensor for determining a tire pressure value of the second tire.

2. The apparatus of claim 1 wherein said tire pressure monitor is mounted internal to the first tire.

3. The apparatus of claim 2 wherein said tire pressure monitor includes a radio frequency transmitter for transmitting the actual tire pressure signal as a radio frequency signal.

4. The apparatus of claim 3 wherein said interrogator is mounted adjacent the first tire, said tire pressure monitor including means for responding to said interrogation signal so as to take a tire pressure measurement and transmit the actual tire pressure radio frequency signal in response thereto.

5. The apparatus of claim 4 wherein said interrogation signal is a low frequency signal.

6. The apparatus of claim 3 wherein said controller includes a receiver for receiving the radio frequency tire pressure signal.

7. The apparatus of claim 6 wherein said receiver includes means for receiving a remote convenience function request and said controller includes means for responding to the remote convenience function request.

8. The apparatus of claim 1 further including display means and wherein said controller further includes means for comparing the determined tire pressure value of the second tire against predetermined limits, said controller activating said display means for notifying a vehicle operator when said determined tire pressure value of the second tire is outside of said limits.

9. The apparatus of claim 1 wherein said first tire and said second tire are located on the same side of the vehicle.

10. The apparatus of claim 1 wherein said first wheel speed sensor and said second wheel speed sensor include variable reluctance sensors.

11. The apparatus of claim 1 wherein said tire pressure monitor is mounted internal to the first tire and includes a radio frequency transmitter for transmitting the actual tire pressure signal as a radio frequency signal, and wherein said interrogator is mounted adjacent the first tire for providing a low frequency interrogation signal to said tire pressure monitor, said tire pressure monitor including means for responding to said low frequency interrogation signal so as to take a tire pressure measurement and transmit the actual tire pressure radio frequency signal in response thereto.

12. The apparatus of claim 11 wherein said first wheel speed sensor includes variable reluctance sensor and wherein said variable reluctance sensor functions as both a transmitting antenna for the low frequency interrogation signal and a receiving antenna for the radio frequency tire pressure signal.

13. The apparatus of claim 12 wherein said controller includes multiplexing means for multiplexing the low frequency interrogation signal and the radio frequency tire pressure signal to process the signals separately.

14. The apparatus of claim 1 further including a third wheel speed sensor associated with a third tire of the vehicle and providing a wheel speed signal upon movement of the vehicle and a fourth wheel speed sensor associated with a fourth tire of the vehicle and providing a wheel speed signal upon movement of the vehicle, said controller correlating the reference wheel speed signal with the wheel speed signals from the third and fourth wheel speed sensors for determining tire pressure values of the third and fourth tires, respectively.

15. The apparatus of claim 14 further including display means and wherein said controller further includes means for comparing the determined tire pressure value of the second, third and fourth tires against predetermined limits, said controller activating said display means for notifying a vehicle operator when any of said determined tire pressure values are outside of said limits.

16. The apparatus of claim 14 wherein said display means includes means for displaying information about the vehicle's four tires separately and wherein said controller includes means for controlling said display to identify which tires are outside of said limits.

17. The apparatus of claim 14 wherein said tire pressure monitor is mounted internal to the first tire and includes a radio frequency transmitter for transmitting the actual tire pressure signal as a radio frequency signal, and wherein said interrogator is mounted adjacent the first, second, third, and fourth tires of the vehicle for providing low frequency interrogation signals, said tire pressure monitor including means for responding to said low frequency interrogation signal so as to take a tire pressure measurement and transmit the actual tire pressure radio frequency signal in response thereto, said controller including means for sequentially activating said interrogator to separately provide low frequency interrogation signals to the four tires and monitoring from which of the tires said radio frequency tire pressure signal is received.

18. The apparatus of claim 17 wherein said separate activation of said interrogator for the four tires occurs each time the vehicle is started.

19. The apparatus of claim 17 wherein said first, second, third, and fourth wheel speed sensors are variable reluctance sensors, each functioning as both a transmitting antenna for its associated low frequency interrogation signal and a receiving antenna for the radio frequency tire pressure signal, said controller including multiplexing means for multiplexing the low frequency interrogation signals and the radio frequency tire pressure signal so as to process the signals separately.

20. The apparatus of claim 14 further including an antilock braking means for monitoring the wheel speed sensors associated with the first, second, third, and fourth tires and controlling a braking system in response thereto.

21. The apparatus of claim 1 wherein said apparatus further includes display means for displaying tire pressure information and wherein said controller includes fault detection means for determining if a fault condition exists in the tire pressure monitor and the first or second wheel speed sensors and activating said display means to notify a vehicle operator when a fault condition is detected.

22. The apparatus of claim 21 wherein said controller includes means for establishing a default pressure correlation value for the reference wheel speed signal when a fault condition is detected with the tire pressure monitor.

23. The apparatus of claim 1 wherein the first and second wheel speed sensors each provide a predetermined number of pulse signals for each rotation of their associated tire.

24. The apparatus of claim 23 wherein said controller correlates the reference wheel speed signal with the wheel speed signal from the second wheel speed sensor based on the count of the pulse signals from both of the wheel speed sensors.

25. The apparatus of claim 23 wherein said controller correlates the reference wheel speed signal with the wheel speed signal from the second wheel speed sensor based on the counts per unit of time of the pulse signals from both of the wheel speed sensors.

26. An apparatus for sensing pressure in vehicle tires comprising:
  means for providing an interrogation signal;
  means for sensing pressure within one of the tires in response to the interrogation signal;
  means for sensing wheel speeds of the vehicle tires and providing wheel speed signals, a wheel speed signal of the one tire in which pressure is sensed being a reference wheel speed signal; and
  means for correlating the reference wheel speed signal with other of the wheel speed signals for determining tire pressure within associated tires.

27. The apparatus of claim 26 wherein said means for sensing pressure is mounted internal to the one tire and includes a radio frequency transmitter for transmitting the sensed tire pressure as a radio frequency signal.

28. The apparatus of claim 27 wherein said means for providing the interrogation signal is mounted adjacent the one tire for providing the interrogation signal to said means for sensing pressure, said means for sensing pressure including means for responding to said interrogation signal so as to take a tire pressure measurement and transmit the sensed radio frequency tire pressure signal in response thereto.

29. The apparatus of claim 28 wherein said means for correlating includes a receiver for receiving the radio frequency tire pressure signal.

30. The apparatus of claim 29 wherein said receiver includes means for receiving a remote convenience function request and said apparatus further includes means for responding to the remote convenience function request.

31. The apparatus of claim 26 further including display means and wherein said means for correlating further includes means for comparing the determined tire pressure value of each of the other tires against predetermined limits and activating said display means for notifying a vehicle operator when said determined tire pressure is outside of said limits.

32. The apparatus of claim 26 wherein said means for sensing pressure is mounted internal to the one tire and includes a radio frequency transmitter for transmitting an actual tire pressure signal as a radio frequency signal, said means for providing an interrogation signal is mounted adjacent the one tire and provides a low frequency interrogation signal to said means for sensing pressure, said means for sensing pressure including means for responding to said low frequency interrogation signal to take a tire pressure measurement and transmit the actual radio frequency tire pressure signal in response thereto.

33. The apparatus of claim 26 further including an antilock braking means for monitoring the means for sensing wheel speeds and for controlling a braking system in response thereto.

34. The apparatus of claim 26 further including display means for displaying tire pressure information and fault detection means for determining if a fault condition exists, said fault detection means activating said display means to notify a vehicle operator when a fault condition is detected.

35. The apparatus of claim 26 wherein the wheel speed signals each provide a predetermined number of pulse signals for each rotation of their associated tire.

36. The apparatus of claim 35 wherein said means for correlating correlates based on the count of the pulse signals from of the wheel speed signals.

37. The apparatus of claim 35 wherein said means for correlating correlates based on the counts per unit of time of the pulse signals of the wheel speed signals.

38. An apparatus for sensing pressure in vehicle tires comprising:
  wheel speed sensors for providing associated wheel speed sensor signals including a plurality of pulses for each revolution of an associated tire;
  an interrogator for providing an interrogation signal;
  a tire pressure monitor for, in response to an interrogation signal, sensing pressure in the tire and providing a pressure signal indicative of the sensed pressure;
  first correlating means for correlating the sensed pressure with an associated wheel speed sensor signal to establish a reference wheel speed signal; and
  second correlating means for correlating the reference wheel speed signal with signals from other of the wheel speed sensors for determining a pressure value of associated tires.

39. An apparatus for sensing pressure in tires on a vehicle having at least two wheel speed sensors, each wheel speed sensor providing an associated wheel speed signal indicative of wheel speed of its associated tire, said apparatus comprising:
  an interrogator for providing an interrogation signal;
  a tire pressure monitor mounted within a tire having an associated one of said at least two wheel speed sensors for, in response to the interrogation signal, measuring tire pressure and providing a signal indicative of measured pressure; and
  a controller for actuating said interrogator to provide the interrogation signal, monitoring the wheel speed signals from the at least two wheel speed sensors, establishing a reference wheel speed signal for the wheel speed sensor of the tire having said tire pressure monitor based on the measured pressure, and determining pressure in other tires having an associated wheel speed sensor by correlation with the reference wheel speed signal.

40. The apparatus of claim 39 wherein the at least two wheel speed sensors each provide a predetermined number of pulse signals for each rotation of their associated tire.

41. The apparatus of claim 40 wherein said controller correlates based on the count of the pulse signals from the at least two wheel speed sensors.

42. The apparatus of claim 40 wherein said controller correlates based on the counts per unit of time of the pulse signals from the at least two wheel speed sensors.

43. An apparatus for sensing tire pressure in vehicle tires comprising;
   wheel speed sensors, at least two vehicle tires having an associated wheel speed sensor, each wheel speed sensor providing a signal having an electrical characteristic indicative of pressure within its associated tire when the vehicle is moving;
   an interrogator for, when actuated, providing an interrogation signal;
   a tire pressure monitor located within, one tire of the vehicle having an associated wheel speed sensor, said tire pressure monitor, in response to the interrogation signal, measuring tire pressure and providing a signal indicative of actual tire pressure;
   controller for actuating the interrogator, monitoring the signal indicative of actual tire pressure, and correlating the wheel speed sensor signal associated with the tire having the tire pressure monitor with the wheel speed signals from the other tires having associated wheel speed sensors for determining pressure in such other tires.

44. The apparatus of claim 43 wherein the wheel speed sensors each provide a predetermined number of pulse signals for each rotation of their associated tire.

45. The apparatus of claim 44 wherein said controller correlates based on the count of the pulse signals from the at least two wheel speed sensors.

46. The apparatus of claim 44 wherein said controller correlates based on the counts per unit of time of the pulse signals from the at least two wheel speed sensors.

47. An apparatus for sensing pressure in vehicle tires comprising:
   means for sensing pressure within one of the tires;
   means for detecting in which tire the means for sensing pressure is located;
   means for sensing wheel speeds of the vehicle tires and providing wheel speed signals, a wheel speed signal of the one tire in which the means for sensing pressure is detected being a reference wheel speed signal; and
   means for correlating the reference wheel speed signal with other of the wheel speed signals for determining tire pressure within associated tires.

48. A method for sensing pressure in vehicle tires comprising the steps of:
   interrogating a pressure measurement with a remote signal;
   sensing pressure within a first tire of the vehicle in response to the interrogation and providing an actual tire pressure signal;
   providing a reference wheel speed signal for the first tire of the vehicle upon movement of the vehicle;
   providing a wheel speed signal for a second tire of the vehicle upon movement of the vehicle;
   monitoring the actual tire pressure signal; and
   correlating the reference wheel speed signal with the wheel speed signal from the second tire and determining a tire pressure value of the second tire in response to the correlating.

49. The method of claim 48 further comprising the step of transmitting the actual tire pressure signal as a radio frequency signal.

50. The method of claim 48 wherein the step of providing a reference wheel speed signal for the first tire of the vehicle includes providing a plurality of pulse signals for each rotation of the first tire and wherein the step of providing the wheel speed signal for the second tire of the vehicle upon movement of the vehicle includes providing a plurality of pulse signals for each rotation of the second tire.

51. The apparatus of claim 50 wherein said step of correlating is based on the count of the pulse signals from the reference wheel speed signal and the wheel speed signal for the second tire.

52. The apparatus of claim 50 wherein said step of correlating is based on the counts per unit of time of the pulse signals from the reference wheel speed signal and the wheel speed signal for the second tire.

53. The method of claim 50 further including the step of notifying a vehicle operator when said determined tire pressure value is outside of predetermined limits.

54. The method of claim 50 wherein the step of interrogating includes transmitting a low frequency signal.

55. A method for sensing pressure in vehicle tires comprising the steps of:
   interrogating a pressure measurement with a remote signal;
   sensing pressure within one of the tires in response to the interrogating;
   sensing wheel speeds of the vehicle tires and providing wheel speed signals, a wheel speed signal for the one tire in which pressure is sensed being a reference wheel speed signal; and
   correlating the reference wheel speed signal with other of the wheel speed signals for determining tire pressure within associated tires.

56. A method for sensing pressure in vehicle tires comprising the steps of:
   providing associated wheel speed sensor signals including a plurality of pulses for each revolution of an associated tire;
   interrogating a tire pressure measurement;
   sensing pressure in one of the tires in response to the interrogating and providing a pressure signal indicative of the sensed pressure;
   correlating the sensed pressure with an associated wheel speed sensor signal to establish a reference wheel speed signal; and
   correlating the reference wheel speed signal with signals from other of the wheel speed sensors for determining a pressure value of associated tires.

57. A method for sensing pressure in tires on a vehicle having at least two wheel speed sensors, each wheel speed sensor providing an associated wheel speed signal indicative of wheel speed of its associated tire, said method comprising the steps of:
   interrogating a tire pressure measurement;
   measuring tire pressure within a tire having an associated one of the at least two wheels speed sensors in response to the interrogating and providing a signal indicative of measured pressure;

monitoring the wheel speed signals from the at least two wheel speed sensors;

establishing a reference wheel speed signal for the wheel speed sensor of the tire having said tire pressure monitor based on the measured pressure; and determining pressure in other tires having an associated wheel speed sensor by correlation with the reference wheel speed signal.

58. A method for sensing pressure in vehicle tires comprising the steps of:

sensing pressure within one of the tires;

detecting in which tire a pressure sensor for sensing the pressure is located;

sensing wheel speeds of the vehicle tires and providing wheel speed signals, a wheel speed signal of the one tire in which the pressure sensor is detected being a reference wheel speed signal; and correlating the reference wheel speed signal with other of the wheel speed signals for determining tire pressure within associated tires.

59. An apparatus for sensing pressure in vehicle tires comprising:

a tire pressure monitor for sensing pressure within a vehicle tire in response to an interrogation signal and providing an actual tire pressure signal based on the sensed pressure;

a controller;

a wheel speed sensor associated with the vehicle tire and connectable to said controller via a connection wire for providing a wheel speed signal to the controller in response to rotation of the vehicle tire;

an interrogator connectable to said controller via said connection wire for, when actuated, providing said interrogation signal to said tire pressure monitor; and a multiplexer for selectively connecting a drive signal from said controller to said interrogator to actuate said interrogator to provide said interrogation signal and for selectively connecting said wheel speed sensor to said controller for monitoring of said wheel speed signal by said controller.

60. The apparatus of claim 59 wherein said controller further includes a low frequency drive circuit for providing a low frequency drive signal to actuate said interrogator, said interrogation signal being a low frequency signal.

61. The apparatus of claim 59 wherein said controller provides said interrogation signal only after said wheel speed signal indicates tire rotation.

62. The apparatus of claim 59 wherein said interrogator uses said wheel speed sensor as a transmitting antenna to transmit said interrogation signal.

63. The apparatus of claim 62 wherein said wheel speed sensor includes variable reluctance sensor.

* * * * *